No. 624,168. Patented May 2, 1899.
D. BRUN.
PORTABLE REFRIGERATING CASE FOR TRANSPORTING FROZEN GOODS.
(Application filed Oct. 27, 1898.)
(No Model.)
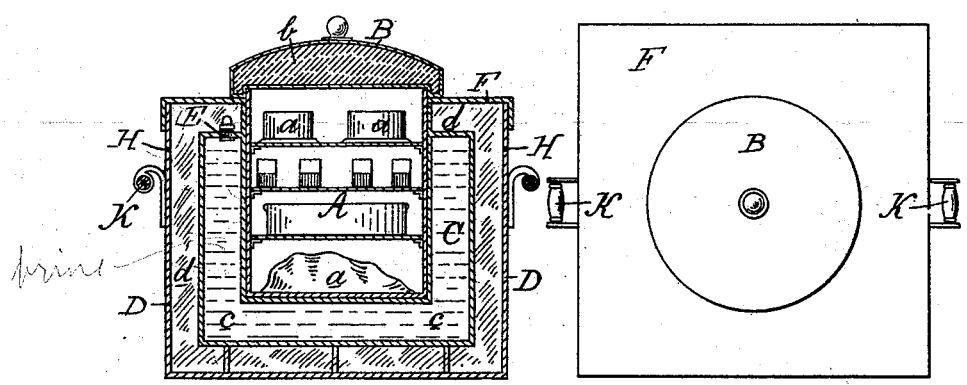
Fig. 1. Fig. 2.
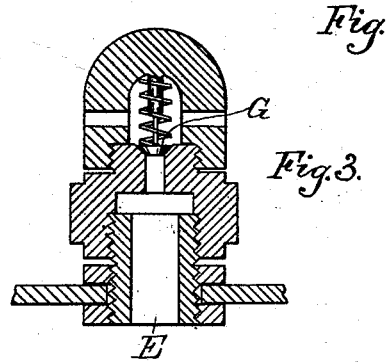
Fig. 3.
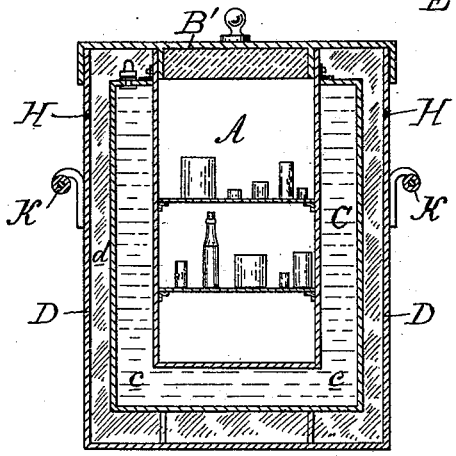
Fig. 5.
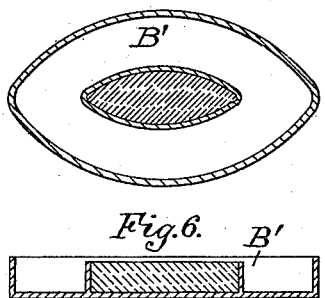
Fig. 6.
Fig. 4.
Witnesses: Inventor:
E. R. Bolton Denis Brun
By 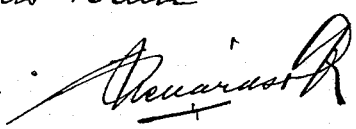
his Attorneys.

UNITED STATES PATENT OFFICE.

DENIS BRUN, OF LONDON, ENGLAND.

PORTABLE REFRIGERATING-CASE FOR TRANSPORTING FROZEN GOODS.

SPECIFICATION forming part of Letters Patent No. 624,168, dated May 2, 1899.

Application filed October 27, 1898. Serial No. 694,729. (No model.)

*To all whom it may concern:*

Be it known that I, DENIS BRUN, a citizen of the French Republic, residing in London, England, have invented a Portable Refrigerating-Case for the Transport of Frozen Goods, (for which I have made application for Letters Patent of Great Britain on September 7, 1898, under No. 19,096,) of which the following is a full, clear, and exact specification.
It is noteworthy that although the consumption of ices, ice-creams, iced sherbets, or iced confectionery has become general and that such goods are most conveniently obtainable at long distances from their actual place of consumption no convenient or satisfactorily-designed traveling-cases exist by which such frozen goods can be maintained in their original condition for several days, so as to admit of transportation over long distances or to be available at any time for use during such extended period of, say, four or five days. The present limit of time for the preservation during transport or in positions where no ice-safes or cold-air chambers are available is about four or five hours, and the usual refrigerating mixture used being ice and salt necessarily deliquesces and is therefore unsuitable for careless transport, as frequently contaminating the contents with the resulting brine and requiring constant attention and renewal. By the use, however, of a liquid brought to an exceedingly low temperature, such as zero Fahrenheit or below that temperature, without solidification as a refrigerating mixture, (such liquids being known,) a much lower temperature may be maintained for a long period during transport without renewal of mixture than can be done with a mixture of ice and salt when the former is employed in a case adapted for the purpose of retaining such liquid without spilling or contamination of the edible contents during transport and for the exclusion of external heat from the cooling medium.
This invention consists of a special construction of case or vessel adapted to be easily portable either by handles or mounted on wheels, to have no leakage of any liquid freezing mixture either externally or into the goods to be conveyed, and which at the same time will protect and maintain inclosed goods at a low temperature for four or five days, for a long period of travel, or will admit of portions of the goods being removed therefrom from time to time during such period without injury to the remainder.

Figure 1 is a sectional elevation of one form of my portable refrigerating-case, and Fig. 2 is a plan thereof. Fig. 3 is a detail of screw-cap and lock-up safety-valve. Fig. 4 is a sectional elevation of a modified form of my portable refrigerating device. Fig. 5 is a plan thereof, and Fig. 6 a sectional elevation of the lid.

Like letters refer to similar parts in the various figures.

To carry out my invention, I form my transportable case for the carriage and preservation of frozen goods in any convenient external shape, either cylindrical, rectangular, or oval, but in all instances consisting of at least three, but, if desired, of more, separate compartments one inside the other and all hermetically closed from one another.

The interior compartment A contains the goods $a$ to be preserved at a low temperature and is closed by a removable lid B, packed with heat-non-conducting material $b$. The next enveloping compartment C contains a liquid cooling medium $c\ c$ at an extremely low temperature and of great thermal capacity, and the external enveloping compartment or compartments D (as these may be duplicated or multiplied as desired) contain a material or materials $d$, resisting the radiation or passage of heat from the external atmosphere inward, such as wool, slag-wool, felt, or the like. The intermediate compartment C is accessible for removal or recharge of the refrigerating liquid medium by a pipe E, closed by a screw-cap which is covered by the external lid or cover F of the outermost case, so that it shall not be tampered with in transit.

In view of any irresistible expansion or discharge of vapor at pressure from the cooling liquid $c\ c$ in the compartment C the said compartment is provided with a lock-up spring-pressed safety-valve G, Fig. 3, which would allow issue of excess pressure into the wool or felt of the external compartment or compartments D D, where it would be absorbed, and a few external drilled holes H H in the external case would prevent accumulation of pressure therein.

Handles K K are provided on my device to facilitate its handling, or the box or case may be mounted on wheels for that purpose.

In Figs. 1 and 2 the outer case D is shown square, but may be of any shape, and has a removable cover F, with an inner hermetically-closed chamber C, adapted to receive a charge of liquid at an extremely low temperature through the screw-cap E, which can be removed for that purpose, and is then screwed down home. The outer case D and the upper part of the intermediate chamber C is then packed with heat-non-conducting substance $d$, such as wool or felt, covering the screw-cap E, and the whole is closed with the cover F. The interior receptacle A for the storage of goods $a$ to be transported in a frozen state is then inserted and packed and covered by the lagged cover B, the whole being then ready for transport.

In Figs. 4, 5, and 6 the form of the receptacle is shown oval. The inner receptacle A forms the inner shell of the intermediate chamber C and is attached thereto, and the whole is closed by a combined cover B', lagged where it covers the inner receptacle.

Having now described the nature of this invention, I declare that what I claim, and desire to secure by Letters Patent, is—

A portable refrigerating-case consisting of in combination an inner chamber adapted to contain frozen or other goods, a lagged removable cover thereon, a secondary enveloping chamber hermetically closed and having a screwed cap and lock-up safety-valve, adapted to receive and retain without spilling a cold and cooling liquid as a layer between first and second chambers having high thermal capacity, tertiary enveloping cases, and having external means for removing lifting and handling layers of non-heat-conducting substance between the secondary and tertiary cases; all chambers being hermetically closed one from the other, substantially as described.

In witness whereof I have hereunto set my hand in presence of two witnesses.

DENIS BRUN.

Witnesses:
RICHARD A. HOFFMANN,
WILLIAM CORNHILL.